US011841376B2

(12) United States Patent
Drews et al.

(10) Patent No.: US 11,841,376 B2
(45) Date of Patent: *Dec. 12, 2023

(54) AUTOMATED VOLUMETRIC REAGENT DELIVERY TESTING

(71) Applicant: Illumina, Inc., San Diego, CA (US)

(72) Inventors: Bradley Kent Drews, Poway, CA (US); Kevin James Cappa, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/301,063

(22) Filed: Mar. 23, 2021

(65) Prior Publication Data

US 2021/0208177 A1    Jul. 8, 2021

Related U.S. Application Data

(63) Continuation of application No. 15/841,085, filed on Dec. 13, 2017, now Pat. No. 10,989,728.
(Continued)

(30) Foreign Application Priority Data

Mar. 24, 2017    (GB) ..................................... 1704772

(51) Int. Cl.
G01N 35/10    (2006.01)
B01L 3/00    (2006.01)
B01L 3/02    (2006.01)

(52) U.S. Cl.
CPC ........ G01N 35/1016 (2013.01); B01L 3/0293 (2013.01); B01L 3/50273 (2013.01);
(Continued)

(58) Field of Classification Search
CPC ........... G01N 35/1016; G01N 35/1002; G01N 35/1009; G01N 35/1097;
(Continued)

(56) References Cited

U.S. PATENT DOCUMENTS 4,725,407 A    2/1988    Usui et al.
5,354,440 A    10/1994    Allington
(Continued)

FOREIGN PATENT DOCUMENTS

CN    105572399    5/2016
EP    1700632    11/2006
(Continued)

OTHER PUBLICATIONS

International Preliminary Report on Patentability dated Jul. 9, 2019 in PCT/US2017/067840.
(Continued)

*Primary Examiner* — Benjamin R Whatley
(74) *Attorney, Agent, or Firm* — Weaver Austin Villeneuve & Sampson LLP

(57) ABSTRACT

A system includes a reagent selector valve controllable to select a reagent flow path from a plurality of reagent flow paths, and a pump coupled to the reagent flow path to draw a liquid through the reagent flow path in accordance with a prescribed test protocol. The system includes a discharge flow path to expel the drawn liquid, and a flow meter to measure liquid displaced by the pump and that outputs data representative of the measured flow. The system also includes a processor to access the data and to determine a volume of the liquid displaced by the pump.

14 Claims, 7 Drawing Sheets

Related U.S. Application Data

(60) Provisional application No. 62/442,736, filed on Jan. 5, 2017.

(52) U.S. Cl.
CPC ... *B01L 3/502715* (2013.01); *B01L 3/502738* (2013.01); *G01N 35/1002* (2013.01); *G01N 35/1009* (2013.01); *G01N 35/1097* (2013.01); *B01L 2200/027* (2013.01); *B01L 2200/143* (2013.01); *B01L 2200/16* (2013.01); *B01L 2300/024* (2013.01); *B01L 2300/0877* (2013.01); *B01L 2400/0478* (2013.01); *B01L 2400/0622* (2013.01); *G01N 2035/1025* (2013.01)

(58) Field of Classification Search
CPC ........... G01N 2035/1025; B01L 3/0293; B01L 2200/027; B01L 2200/143; B01L 2200/16; B01L 2300/024; B01L 2300/0877; B01L 2400/0478; B01L 2400/0622
See application file for complete search history.

(56) References Cited

U.S. PATENT DOCUMENTS

| | | | |
|---|---|---|---|
| 5,691,486 | A | 11/1997 | Behringer et al. |
| 10,989,728 | B2 | 4/2021 | Drews et al. |
| 2005/0217351 | A1 | 10/2005 | Kreck et al. |
| 2007/0116601 | A1 | 5/2007 | Patton |
| 2009/0150106 | A1 | 6/2009 | Erickson et al. |
| 2010/0111768 | A1 | 5/2010 | Banerjee et al. |
| 2010/0285522 | A1 | 11/2010 | Su et al. |
| 2010/0300895 | A1 | 12/2010 | Nobile et al. |
| 2012/0285558 | A1 | 11/2012 | Witt et al. |
| 2013/0260372 | A1 | 10/2013 | Buermann et al. |
| 2014/0177378 | A1 | 6/2014 | Kahlon et al. |
| 2015/0346149 | A1 | 12/2015 | Brown et al. |
| 2016/0047805 | A1 | 2/2016 | Quinn |
| 2016/0146365 | A1 | 5/2016 | Yuan |

FOREIGN PATENT DOCUMENTS

| | | |
|---|---|---|
| WO | 2009102688 | 8/2009 |
| WO | 2012096703 | 7/2012 |
| WO | 2014150853 | 9/2014 |

OTHER PUBLICATIONS

TW Office Action dated Feb. 11, 2022, in Application No. TW106145537 with English translation.
U.S. Notice of Allowance dated Jan. 4, 2021 in U.S. Appl. No. 15/841,085.
U.S. Office Action dated Aug. 4, 2020 issued in U.S. Appl. No. 15/841,085.
U.S. Office Action dated Jan. 31, 2020 issued in U.S. Appl. No. 15/841,085.
TW Office Action dated Aug. 2, 2021, in Application No. 106145537.
GB Search Report, dated Oct. 2, 2017, in Application No. GB1704772.1.
PCT/US2017/067840, "International Search Report and Written Opinion," dated Apr. 13, 2018, 20 pages.
CN Office Action dated Jun. 12, 2023, in Application No. CN201780084612.5 with English translation.
Zhou, H., et al., "Promoting Water Conservation," Zhejiang Gongshang University Press, Dec. 2014, p. 76.

AUTOMATED VOLUMETRIC REAGENT DELIVERY TESTING

CROSS-REFERENCE TO RELATED APPLICATIONS

This application is a continuation under 35 U.S.C. § 120 of U.S. patent application Ser. No. 15/841,085, filed Dec. 13, 2017, which claims benefit of priority under 35 U.S.C. § 119(e) to U.S. Patent Application No. 62/442,736, filed Jan. 5, 2017, as well as benefit of priority under 35 U.S.C. § 119(a) to British (GB) Patent Application No. 1704772.1, filed Mar. 24, 2017, which also claims benefit of priority to U.S. Patent Application No. 62/442,736, filed Jan. 5, 2017, all of which are hereby incorporated by reference herein in their entireties.

BACKGROUND

Instruments have been developed and continue to evolve for sequencing molecules of interest, particularly DNA, RNA and other biological samples. In advance of sequencing operations, samples of the molecules of interest are prepared in order to form a library or template which will be mixed with reagents and ultimately introduced into a flow cell where individual molecules will attach at sites and be amplified to enhance detectability. The sequencing operation, then, includes repeating a cycle of steps to bind the molecules at the sites, tag the bound components, image the components at the sites, and process the resulting image data.

In such sequencing systems, fluidic systems (or subsystems) provide the flow of substances (e.g., the reagents) under the control of a control system, such as a programmed computer and appropriate interfaces.

SUMMARY

Details of one or more implementations of the subject matter described in this specification are set forth in the accompanying drawings and the description below. Other features, aspects, and advantages will become apparent from the description, the drawings, and the claims.

In some implementations, a system is provided that includes a reagent selector valve controllable to select a reagent flow path from a plurality of reagent flow paths, a pump fluidically coupled to the reagent flow path to draw a fluid through the selected reagent flow path in accordance with a prescribed test protocol and to then discharge the drawn fluid via a discharge flow path fluidically coupled with the pump, a flow meter to measure liquid flow rates caused by displacement of any liquid in the pump through the discharge flow path during discharge of the drawn fluid from the pump and to generate data representative of the measured liquid flow rates, and control circuitry operatively coupled to the reagent selector valve, the pump, and the flow meter, the control circuitry having one or more processors and a memory to store machine-executable instructions which, when executed by the one or more processors, control the one or more processors to access the data and to determine a volume of the liquid discharged by the pump from the data.

In some implementations of the system, the pump may include a syringe pump.

In some implementations of the system, the flow meter may be fluidically in-line with the discharge flow path.

In some implementations of the system, the memory may be to store, or may store, further machine-executable instructions which, when executed by the one or more processors, further control the one or more processors to cause the one or more processors to determine a steady-state flow rate using data starting a predetermined amount of time after a pumping cycle begins and ending a predetermined amount of time before the pumping cycle ends.

In some implementations of the system, the memory may be to store, or may store, further machine-executable instructions which, when executed by the one or more processors, further control the one or more processors to cause the one or more processors to integrate the measured liquid flow rates to obtain the total volume of the liquid displaced by the pump.

In some implementations of the system, the memory may be to store, or may store, further machine-executable instructions which, when executed by the one or more processors, further control the one or more processors to cause the one or more processors to perform low-pass filtering of the measured liquid flow rates.

In some implementations of the system, the memory may be to store, or may store, further machine-executable instructions which, when executed by the one or more processors, further control the one or more processors to control operation of the reagent selector valve and of the pump to perform multiple reagent displacement tests, in which for each reagent displacement test, the one or more processors are controlled to: a) cause the reagent selector valve to select a different one of the reagent flow paths as a selected reagent flow path, b) cause the pump to aspirate a predetermined quantity of fluid while fluidically connected with the selected reagent flow path, c) cause the pump to expel the fluid from (b) through a discharge flow path, and d) obtain data from the flow meter regarding the measured liquid flow rate of any liquid flowing through the discharge flow path as a result of (c).

In some implementations of the system, the memory may be to store, or may store, further machine-executable instructions which, when executed by the one or more processors, further control the one or more processors to determine, for each displacement test, whether a fault condition exists responsive to the data obtained in (d) indicating that a total amount of liquid flowed through the discharge flow path in (c) is outside of a first predetermined threshold amount of the predetermined quantity of fluid of (b), and to provide a notification to a user when it is determined that the fault condition exists for one or more of the reagent displacement tests.

In some implementations of the system, the pump may be to draw and discharge between about 2000 microliters and about 4000 microliters of fluid.

In some implementations of the system, the pump may be to draw and discharge the fluid at a fluid flow rate of between about 1000 microliters per minute and about 10000 microliters per minute.

In some implementations, a system may be provided that includes a flow cell through which reagents from a plurality of reagent recipients are to be pumped during a genetic sequencing operation; a reagent selector valve controllable to select a selected reagent from the plurality of reagent recipients; a common line selector valve fluidically connected with the reagent selector valve and controllable to selectively direct the selected reagent the flow cell or through a bypass line; a discharge flow path; a flow meter fluidically coupled to the discharge flow path to measure liquid flowed through the discharge flow path and to generate data representative of the measured liquid flow; a pump fluidically interposed between i) the discharge flow path and ii) the flow cell and the bypass line, the pump to draw the selected reagent through a flow path defined by positions of the reagent selector valve and the common line selector valve and to expel the selected reagent through the discharge flow path; and control circuitry operatively coupled to the reagent selector valve, the common line selector valve, the pump, and the flow meter, the control circuitry having one or more processors and a memory to store machine-executable instructions which, when executed by the one or more processors, control the one or more processors to access the data and to determine a volume of the liquid expelled by the pump.

In some implementations of the system, the memory may be to store, or may store, further machine-executable instructions which, when executed by the one or more processors, further control the one or more processors cause the reagent selector valve and the common line selector valve to define a desired flow path.

In some implementations of the system, the memory may be to store, or may store, further machine-executable instructions which, when executed by the one or more processors, further control the one or more processors to perform multiple reagent displacement tests, wherein for each reagent displacement test, the one or more processors are controlled to: a) cause the reagent selector valve to select a different reagent and the common line selector valve to select between the flow cell or the bypass line to define a selected flow path, b) cause the pump to aspirate a predetermined quantity of fluid through the selected flow path, c) cause the pump to expel the fluid from (b) through the discharge flow path, and d) obtain data from the flow meter regarding the measured liquid flow rate of any liquid reagent flowing through the discharge flow path resulting from (c).

In some implementations of the system, the memory may be to store, or may store, further machine-executable instructions which, when executed by the one or more processors, further control the one or more processors to determine, for each displacement test, whether a fault condition exists responsive to the data obtained in (d) indicating that a total volume of liquid flowed through the discharge flow path in (c) is outside of a first predetermined threshold amount of the predetermined quantity of fluid of (b), and to provide a notification to a user when it is determined that the fault condition exists for one or more of the reagent displacement tests.

In some implementations of the system, the memory may be to store, or may store, further machine-executable instructions which, when executed by the one or more processors, further control the one or more processors to integrate the measured liquid flow rate from (d) to obtain the total volume of the fluid expelled by the pump in (c).

In some implementations, a method may be provided that includes implementing a stored test protocol for performing one or more reagent displacement tests, in which each reagent displacement test includes: a) selecting a reagent flow path from a plurality of reagent flow paths, b) actuating a pump to draw a predetermined amount of fluid through the selected reagent flow path in accordance with the stored test protocol, c) discharging the drawn fluid from the pump and through a discharge flow path, d) measuring flow rates of any liquid discharged through the discharge flow path during (c) and generating data representative of the flow rates, and e) processing the data to determine a quality of the selected reagent flow path.

In some implementations of the method, (a) through (e) may be repeated for different reagent flow paths.

In some implementations of the method, (e) may further include: f) determining, during (e), a total volume of the liquid flowed through the discharge flow path during (c) using the data, g) determining that the total volume of the liquid flow through the discharge path during (c) is outside of a first threshold amount from the predetermined amount of fluid that the selected reagent flow path of (a) has a fault, and h) responsive to (g), producing a notification regarding the fault.

In some implementations of the method, (e) may include low-pass filtering the data.

In some implementations of the method, (f) may include integrating the data to obtain the total volume of the liquid flowed through the discharge flow path during (c).

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
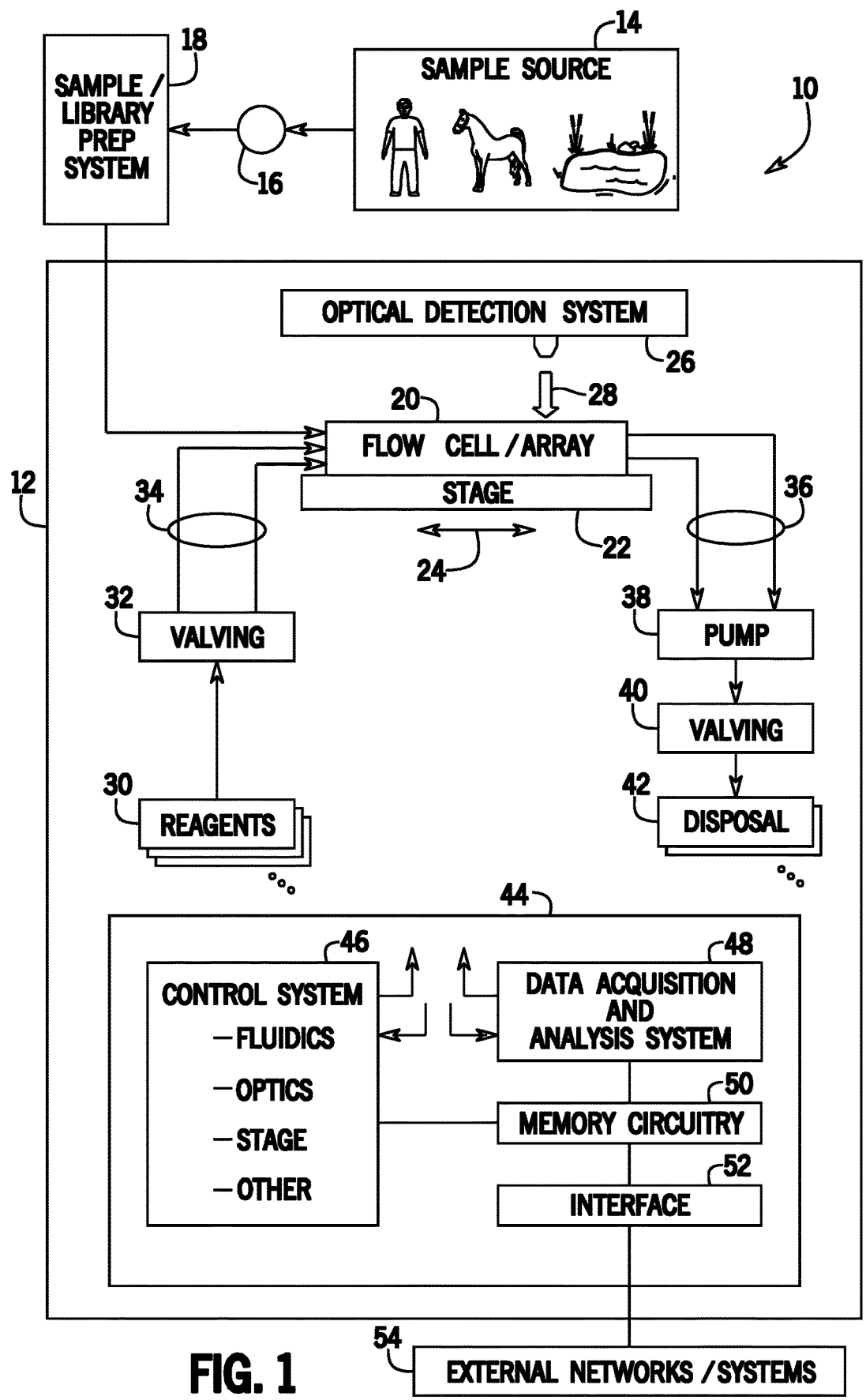
FIG. 1 is a diagrammatical overview of an example sequencing system in which the disclosed techniques may be employed.

FIG. 1 illustrates an implementation of a sequencing system 10 to process molecular samples that may be sequenced to determine their components, the component ordering, and generally the structure of the sample. The system includes an instrument 12 that receives and processes a biological sample. A sample source 14 provides the sample 16 which in many cases will include a tissue sample. The sample source may include, for example, an individual or subject, such as a human, animal, microorganism, plant, or other donor (including environmental samples), or any other subject that includes organic molecules of interest, the sequence of which is to be determined. The system may be used with samples other than those taken from organisms, including synthesized molecules. In many cases, the molecules will include DNA, RNA, or other molecules having base pairs the sequence of which may define genes and variants having particular functions of ultimate interest.

The sample 16 is introduced into a sample/library preparation system 18. This system may isolate, break, and otherwise prepare the sample for analysis. The resulting library includes the molecules of interest in lengths that facilitate the sequencing operation. The resulting library is then provided to the instrument 12 where the sequencing operation is performed. In practice, the library, which may sometimes be referred to as a template, is combined with reagents in an automated or semi-automated process, and then introduced to the flow cell prior to sequencing.

In the implementation illustrated in FIG. 1, the instrument includes a flow cell or array 20 that receives the sample library. The flow cell includes one or more fluidic channels that allow for sequencing chemistry to occur, including attachment of the molecules of the library, and amplification at locations or sites that can be detected during the sequencing operation. For example, the flow cell/array 20 may include sequencing templates immobilized on one or more surfaces at the locations or sites. A "flow cell" may include a patterned array, such as a microarray, a nanoarray, and so forth. In practice, the locations or sites may be disposed in a regular, repeating pattern, a complex non-repeating pattern, or in a random arrangement on one or more surfaces of a support. To enable the sequencing chemistry to occur, the flow cell also allows for introduction of substances, such as including various reagents, buffers, and other reaction media, that are used for reactions, flushing, and so forth. The substances flow through the flow cell and may contact the molecules of interest at the individual sites.

In the instrument the flow cell 20 is mounted on a movable stage 22 that, in this implementation, may be moved in one or more directions as indicated by reference numeral 24. The flow cell 20 may, for example, be provided in the form of a removable and replaceable cartridge that may interface with ports on the movable stage 22 or other components of the system in order to allow reagents and other fluids to be delivered to or from the flow cell 20. The stage is associated with an optical detection system 26 that can direct radiation or light 28 to the flow cell during sequencing. The optical detection system may employ various methods, such as fluorescence microscopy methods, for detection of the analytes disposed at the sites of the flow cell. By way of a non-limiting example, the optical detection system 26 may employ confocal line scanning to produce progressive pixilated image data that can be analyzed to locate individual sites in the flow cell and to determine the type of nucleotide that was most recently attached or bound to each site. Other suitable imaging techniques may also be employed, such as techniques in which one or more points of radiation are scanned along the sample or techniques employing "step and shoot" imaging approaches. The optical detection system 26 and the stage 22 may cooperate to maintain the flow cell and detection system in a static relationship while obtaining an area image, or, as noted, the flow cell may be scanned in any suitable mode (e.g., point scanning, line scanning, "step-and-shoot" scanning).

While many different technologies may be used for imaging, or more generally for detecting the molecules at the sites, presently contemplated implementations may make use of confocal optical imaging at wavelengths that cause excitation of fluorescent tags. The tags, excited by virtue of their absorption spectrum, return fluorescent signals by virtue of their emission spectrum. The optical detection system 26 is configured to capture such signals, to process pixelated image data at a resolution that allows for analysis of the signal-emitting sites, and to process and store the resulting image data (or data derived from it).

In a sequencing operation, cyclic operations or processes are implemented in an automated or semi-automated fashion in which reactions are promoted, such as with single nucleotides or with oligonucleotides, followed by flushing, imaging and de-blocking in preparation for a subsequent cycle. The sample library, prepared for sequencing and immobilized on the flow cell, may undergo a number of such cycles before all useful information is extracted from the library. The optical detection system may generate image data from scans of the flow cell (and its sites) during each cycle of the sequencing operation by use of electronic detection circuits (e.g., cameras or imaging electronic circuits or chips). The resulting image data may then be analyzed to locate individual sites in the image data, and to analyze and characterize the molecules present at the sites, such as by reference to a specific color or wavelength of light (a characteristic emission spectrum of a particular fluorescent tag) that was detected at a specific location, as indicated by a group or cluster of pixels in the image data at the location. In a DNA or RNA sequencing application, for example, the four common nucleotides may be represented by distinguishable fluorescence emission spectra (wavelengths or wavelength ranges of light). Each emission spectrum, then, may be assigned a value corresponding to that nucleotide. Based upon this analysis, and tracking the cyclical values determined for each site, individual nucleotides and their orders may be determined for each site. These sequences may then be further processed to assemble longer segments including genes, chromosomes, and so forth. As used in this disclosure the terms "automated" and "semi-automated" mean that the operations are performed by system programming or configuration with little or no human interaction once the operations are initiated, or once processes including the operations are initiated.

In the illustrated implementation, reagents 30 are drawn or aspirated into the flow cell through valving 32. The valving may access the reagents from recipients or vessels in which they are stored, such as through pipettes or sippers (not shown in FIG. 1). The valving 32 may allow for selection of the reagents based upon a prescribed sequence of operations performed. The valving may further receive commands for directing the reagents through flow paths 34 into the flow cell 20. Exit or effluent flow paths 36 direct the used reagents from the flow cell. In the illustrated implementation, a pump 38 serves to move the reagents through the system. The pump may also serve other useful functions, such as measuring reagents or other fluids through the system, aspirating air or other fluids, and so forth. Additional valving 40 downstream of pump 38 allows for appropriately directing the used reagent to disposal vessels or recipients 42.

The instrument further includes a range of circuitry that aids in commanding the operation of the various system components, monitoring their operation by feedback from sensors, collecting image data, and at least partially processing the image data. In the implementation illustrated in FIG. 1, a control/supervisory system 44 includes a control system 46 and a data acquisition and analysis system 48. Both systems will include one or more processors (e.g., digital processing circuits, such as microprocessors, multi-core processors, FPGA's, or any other suitable processing circuitry) and associated memory circuitry 50 (e.g., solid state memory devices, dynamic memory devices, on and/or off-board memory devices, and so forth) that may store machine-executable instructions for controlling, for example, one or more computers, processors, or other similar logical devices to provide certain functionality. Application-specific or general purpose computers may at least partially make up the control system and the data acquisition and analysis system. The control system may include, for example, circuitry is (e.g., programmed) to process commands for fluidics, optics, stage control, and any other useful functions of the instrument. The data acquisition and analysis system 48 interfaces with the optical detection system to command movement of the optical detection system or the stage, or both, the emission of light for cyclic detection, receiving and processing of returned signals, and so forth. The instrument may also include various interfaces as indicated at reference 52, such as an operator interface that permits control and monitoring of the instrument, loading of samples, launching of automated or semi-automated sequencing operations, generation of reports, and so forth. Finally, in the implementation of FIG. 1, external networks or systems 54 maybe coupled to and cooperate with the instrument, for example, for analysis, control, monitoring, servicing, and other operations.

It may be noted that while a single flow cell and fluidics path, and a single optical detection system are illustrated in FIG. 1, in some instruments more than one flow cell and fluidics path may be accommodated. For example, in a presently contemplated implementation, two such arrangements are provided to enhance sequencing and throughput. In practice, any number of flow cells and paths may be provided. These may make use of the same or different reagent receptacles, disposal receptacles, control systems, image analysis systems, and so forth. Where provided, the multiple fluidics systems may be individually controlled or controlled in a coordinated fashion. It is to be understood that the phrase "fluidically connected" may be used herein to describe connections between two or more components that place such components in fluidic communication with one another, much in the same manner that "electrically connected" may be used to describe an electrical connection between two or more components. The phrase "fluidically interposed" may be used, for example, to describe a particular ordering of components. For example, if component B is fluidically interposed between components A and C, then fluid flowing from component A to component C would flow through component B before reaching component C.

Figure 2:
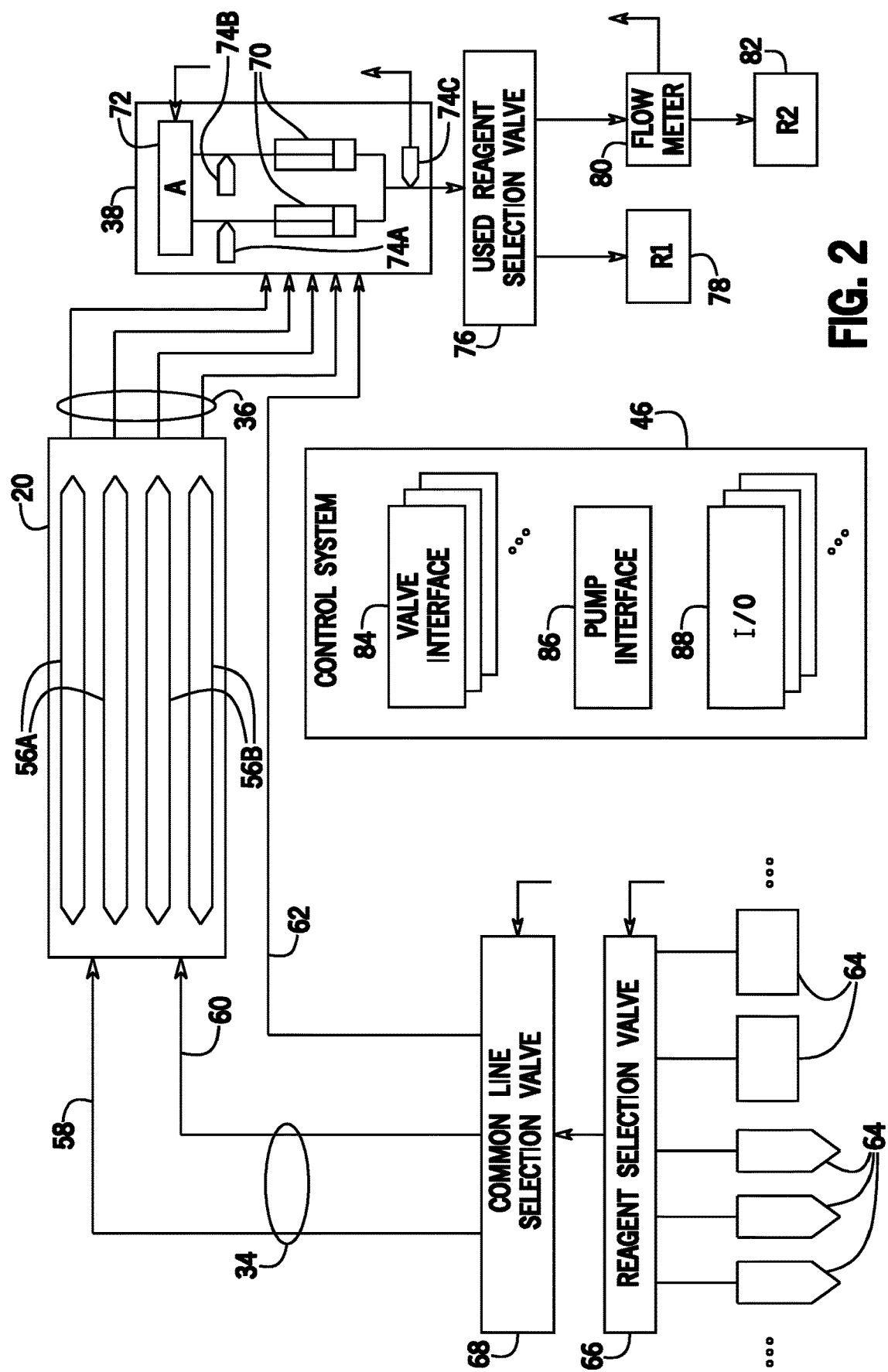
FIG. 2 is a diagrammatical overview of an example fluidic system of the sequencing system of FIG. 1.

FIG. 2 illustrates an example fluidic system of the sequencing system of FIG. 1. In the implementation illustrated, the flow cell 20 includes a series of pathways or lanes 56A and 56B which may be grouped in pairs for receiving fluid substances (e.g., reagents, buffers, reaction media) during sequencing operations. The lanes 56A are coupled to a common line 58 (a first common line), while the lanes 56B are coupled to a second common line 60. A bypass line 62 is also provided to allow fluids to bypass the flow cell without entering it. As noted above, a series of vessels or recipients 64 allow for the storage of reagents and other fluids that may be utilized during the sequencing operation. A reagent selector valve (RSV) 66 is mechanically coupled to a motor or actuator (not shown) to allow selection of one or more of the reagents to be introduced into the flow cell. Selected reagents are then advanced to a common line selector valve (CLSV) 68 which similarly includes a motor (not shown). The common line selector valve may be commanded to select one or more of the common lines 58 and 60, or both common lines, to cause the reagents 64 to flow to the lanes 56A and/or 56B in a controlled fashion, or the bypass line 62 to flow one or more of the reagents through the bypass line. It may be noted that other useful operations may be enabled by the bypass line, such as the ability to prime all reagents (and liquids) to the reagent selector valve (and the common line selector valve) without drawing air through the flow cell, the ability to perform washing (e.g., automated or semi-automated washing) of the reagent channels and sippers independent of the flow cell, and the ability to perform diagnostic functions (e.g., pressure and volume delivery tests) on the system.

Used reagents exit the flow cell through lines coupled between the flow cell and the pump 38. In the illustrated implementation, the pump includes a syringe pump having a pair of syringes 70 that are controlled and moved by an actuator 72 to aspirate the reagents and other fluids and to eject or expel the reagents and fluids during different operations of the testing, verification and sequencing cycles. The pump assembly may include various other parts and components, including valving, instrumentation, actuators, and so forth (not shown). In the illustrated implementation, pressure sensors 74A and 74B sense pressure on inlet lines of the pump, while a pressure sensor 74C is provided to sense pressures output by the syringe pump.

Fluids used by the system enter a used reagent selector valve (URSV) 76 from the pump. This valve allows for selection of one of multiple flow paths for used reagents and other fluids. In the illustrated implementation, a first flow path leads to a first used reagent receptacle 78, while a second flow path leads through a flow meter 80 a second used reagent receptacle 82. Depending upon the reagents used, it may be advantageous to collect the reagents, or certain of the reagents in separate vessels for disposal, and the used reagent selector valve 76 allows for such control.

It should be noted that valving within the pump assembly may allow for various fluids, including reagents, solvents, cleaners, air, and so forth to be aspirated by the pump and injected or circulated through one or more of the common lines, the bypass line, and the flow cell. Moreover, as noted above, in a presently contemplated implementation, two parallel implementations of the fluidics system shown in FIG. 2 are provided under common control. Each of the fluidics systems may be part of a single sequencing instrument, and may carry out functions including sequencing operations on different flow cells and sample libraries in parallel.

The fluidics system operates under the command of control system 46 which implements prescribed protocols for testing, verification, sequencing, and so forth. The prescribed protocols will be established in advance and include a series of events or operations for activities such as aspirating reagents, aspirating air, aspirating other fluids, expelling such reagents, air and fluids, and so forth. The protocols will allow for coordination of such fluidic operations with other operations of the instrument, such as reactions occurring in the flow cell, imaging of the flow cell and its sites, and so forth. In the illustrated implementation, the control system 46 employs one or more valve interfaces 84 which are to provide command signals for the valves, as well as a pump interface 86 to command operation of the pump actuator. Various input/output circuits 88 may also be provided for receiving feedback and processing such feedback, such as from the pressure sensors 74A-C and flow meter 80.

Figure 3:
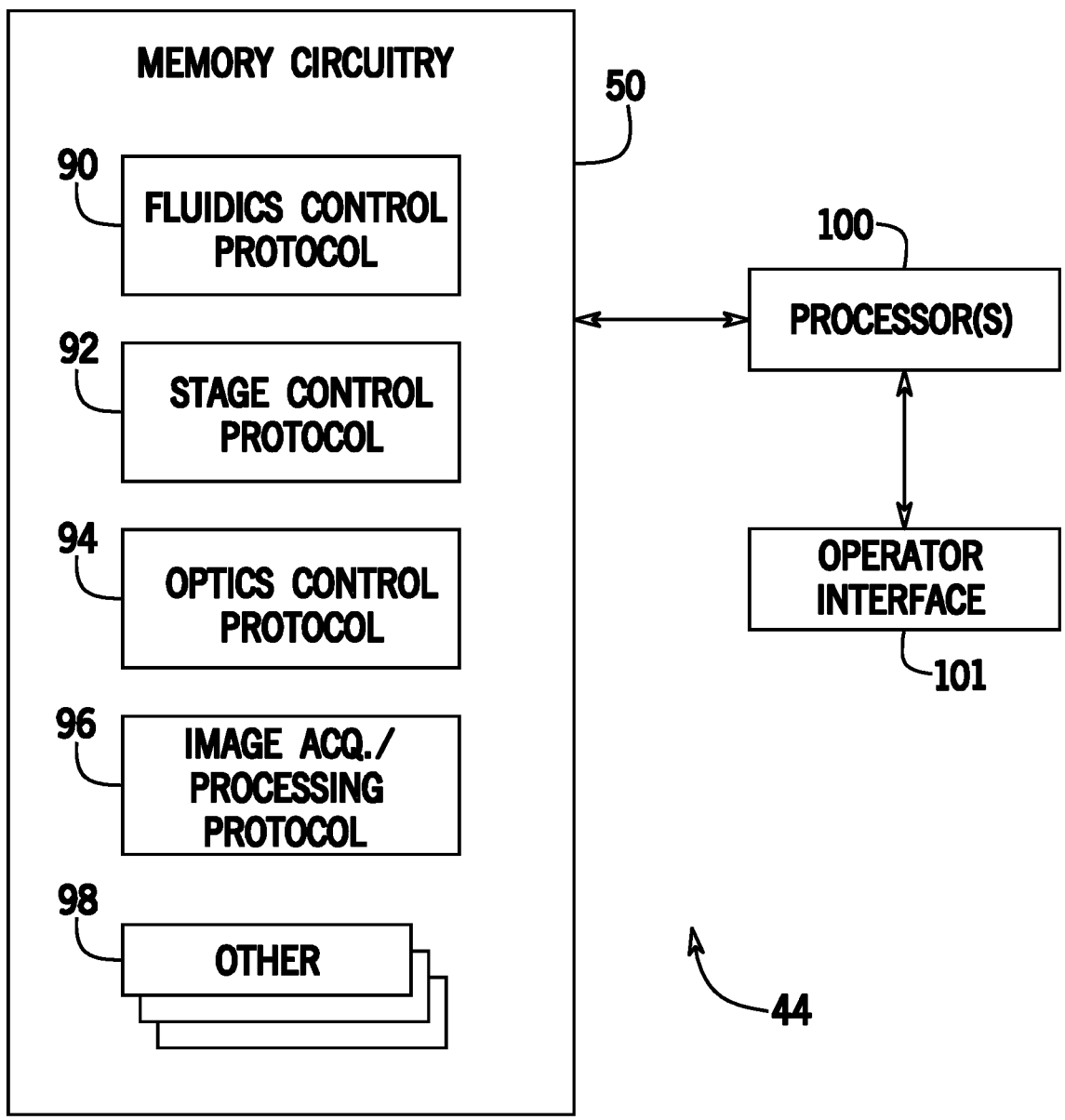
FIG. 3 is a diagrammatical overview of an example processing and control system of the sequencing system of FIG. 1.

FIG. 3 illustrates an example of certain functional components of the control/supervisory system 44. As illustrated, the memory circuitry 50 stores prescribed routines that are executed during testing, commissioning, troubleshooting, servicing, and sequencing operations. Many such protocols and routines may be implemented and stored in the memory circuitry, and these may be updated or altered from time to time. As illustrated in FIG. 3, these may include a fluidics control protocol 90 for controlling the various valves, pumps, and any other fluidics actuators, as well as for receiving and processing feedback from fluidics sensors, such as valves, and flow and pressure sensors. A stage control protocol 92 allows for moving the flow cell as desired, such as during imaging. An optics control protocol 94 allows for commands to be issued to the imaging components to illuminate portions of the flow cell and to receive returned signals for processing. An image acquisition and processing protocol 96 allows for the image data to be at least partially processed for extraction of useful data for sequencing. Other protocols and routines may be provided in the same or different memory circuitry as indicated by reference 98. In practice, the memory circuitry may be provided as one or more memory devices, such as both volatile and non-volatile memories. This memory may be within the instrument, and some may be off-board.

One or more processors 100 access the stored protocols and implement them on the instrument. As noted above, the processing circuitry may be part of application-specific computers, general-purpose computers, or any suitable hardware, firmware and software platform. The processors and the operation of the instrument may be commanded by human operators via an operator interface 101. The operator interface may allow for testing, commissioning, troubleshooting, and servicing, as well as for reporting any issues that may arise in the instrument. The operator interface may also allow for launching and monitoring sequencing operations.

As set forth above, to enable the sequencing to occur, the reagents are introduced for reactions based upon a prescribed sequence of operations performed. It may be desirable to perform a diagnostic test to check the fluidic system for leaks or blockages during manufacture, commissioning, or use, to avoid incorrect reagent amounts being delivered. To avoid manual operation for accuracy determination of reagent delivery, an automated volumetric reagent delivery test is provided as described below.

Figure 4:
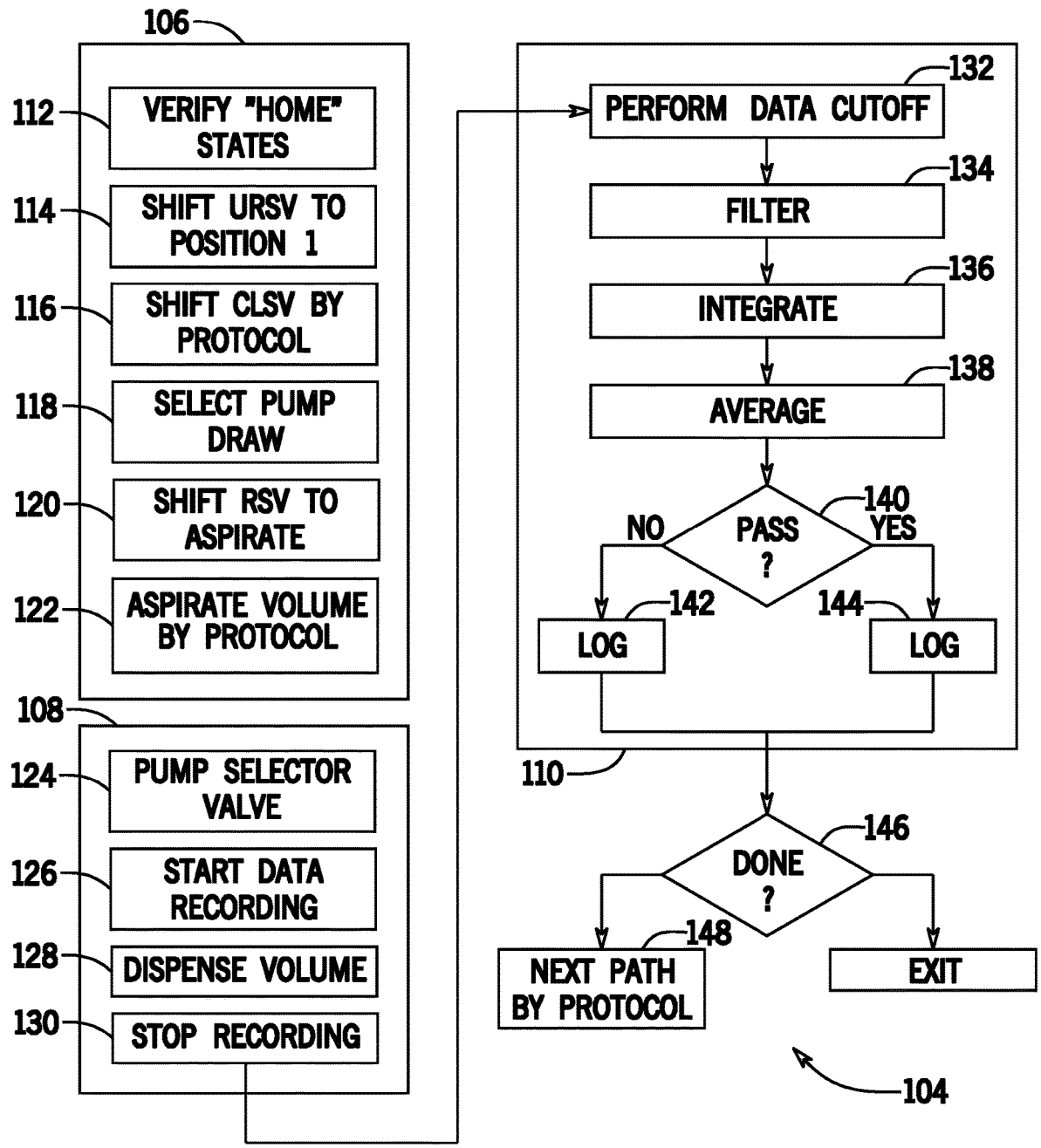
FIG. 4 is a flow chart illustrating an example of a delivery test control logic for an automated volumetric reagent delivery test performed on the sequencing system of FIG. 1.

FIG. 4 is a flow chart illustrating an example of delivery test control logic 104 for an automated volumetric reagent delivery test that may be performed on the sequencing system 10. One or more events of the delivery test control logic 104 may be executed by the control/supervising system 44 (e.g., the control system 46 and the data acquisition and analysis system 48). In the illustrated implementation, the delivery test control logic 104 may include a process 106 to perform an aspiration sequence (including 112 through 122), a process 108 to perform a delivery sequence (including 124 through 130), and a process 110 to perform a data process/analysis sequence (including 132 through 144). The delivery test control logic 104 may also include logic 146 to exit the delivery test control logic 104 and a process 148 to repeat the delivery test control logic 104 to test another flow path (reagent) of interest.

Upon initiation of the delivery test control logic 104, the control system 46 may verify in block 112 various "home" states of the sequencing system 10. For example, the sequencing system 10 may have been in an idle state such that upon initiation of the delivery test control logic 104, the control system 46 may first verify that various valves are homed (e.g., the RSV 66, the CLSV 68, the URSV 76) and pumps are homed (e.g., the pump 38), among other things. Homing, as the term is used herein, refers to the process of returning an adjustable component to a default or "home" position, e.g., to a particular limit of operation or a predefined setting. At 114, the control system 46 may shift the URSV 76 to a first position to fluidically connect a discharge flow path (which may be downstream of the pump 38) with recipient 82. In certain implementations, the control system 46 may shift the URSV 76 to a second position different from the first position to fluidically connect the discharge flow path with recipient 78. At 116, the control system 46 may shift the CLSV 68 to a position or port that corresponds to a respective flow path. For example, the flow paths may include one or more of the pathways or lanes 56A fluidically connected with the first common line 58, or the pathways or lanes 56B fluidically connected with the second common line 60, the flow paths may also include the bypass line 62. Different positions or ports of the CLSV 68 may each correspond to one of the flow paths set forth above-thus, by shifting the CLSV 68 to a particular position, a respective flow path may be selected.

At 118, the control system 46 may actuate one or more valves that may be part of the pump or pumps 38 to that the pump(s) are fluidically connected with a respective reagent flow path either through the flow cell 20 or through the bypass line 62. For example, the control system 46 may cause a valve to fluidically couple output/input of the pump 38 to a first port of the pump 38 that is fluidically connected with a reagent flow path connecting to the flow cell 20 or the control system 46 may cause the valve to fluidically couple the output/input of the pump 38 to a second port of the pump 38 that is fluidically connected with a reagent flow path connecting to the bypass line 62. At 120, the control system 46 may shift the RSV 66 to allow for aspiration of a particular reagent from a plurality of different reagents. For example, the RSV 66 may shift to different positions or ports, in which each position or port corresponds to a respective reagent. It may be appreciated that processes 114 to 120 may or may not be executed and/or in the same order as described above. In certain implementations, processes 114 to 120 may be executed in parallel to one another or at the same time.

At 122, the control system 46 controls the pump 38 to aspirate a volume of reagent or other liquid or fluid from a reagent source or other source via the flow path that passes through the RSV 66 and the CLSV 68. Upon the completion of the processes 112 to 120, a flow path of interest will have been established, thereby selecting a respective reagent of interest, and the control system 46 may begin to aspirate volume by protocol, e.g., aspirating a specified volume of the selected reagent of interest as determined by a particular protocol, such as a test protocol or an analysis protocol. This concludes the aspiration sequence (106). Next, the delivery test control logic 104 may proceed to the delivery sequence 108 (including processes 124 to 130). At 124, the control system 46 may cause the valve that is part of the pump 38 to actuate to a dispense configuration so that when the pump 38 is actuated to expel the aspirated reagent out of the pump 38, the dispensed fluid flows to a designated port. For example, valve position of a valve of a pump 38 may be changed to "dispense" at the pump 38 to cause the fluid to be dispensed to the URSV 76 instead of to the flow cell 20 or the bypass line 62. In other words, during the delivery sequence (108), what is drawn by the pump 38 from the aspiration sequence (106) is dispensed toward the URSV 76. The URSV 76 may be controlled so as to route the dispensed fluid through a discharge flow path that leads through the flow meter 80 to used reagent recipient 82.

At 126, the control system 46 starts data (e.g., flow rate data) recording via the flow meter 80. The data may be recorded continuously or in any suitable time intervals. It may be appreciated that the data-recording interval may be as short as a flow response time of the flow meter 80 (e.g., about 20 milliseconds). In the process 128, the control system 46 causes the pump 38 to start dispensing fluid volume and the dispensed fluid flows into recipient 82. At 130, the control system 46 stops recording the data (e.g., flow rate data). In certain implementations, the data recording may occur until the syringes 70 of the pump 38 complete the dispensing motion, i.e., during the entire dispense cycle of the pump 38. In certain implementations, the termination of data recording may occur when the flow rate reaches a steady-state, or at any other suitable time according to the test protocol.

Once data is collected for a given reagent/flow path, the volumetric flow rate data may be analyzed in one or more ways to perform various diagnostic checks. For example, in some implementations, the flow rate data may be analyzed in order to determine how much liquid is dispensed from the pump 38 after a given amount of liquids (reagents) are aspirated—if the total amount that is dispensed is less (or more) than the total amount that was to be aspirated, then an error condition may be determined. For example, a test protocol may include driving the pump 38 to aspirate 2000 µL of a particular reagent via a selected flow path and then then actuating the pump 38 to completely dispense all of the aspirated liquid through the flow meter 80. If the flow meter 80 collects data that indicates that only 1500 µL was flowed through the flow meter 80, then this may be indicative of some type of system error, e.g., a leak in the flow path by which 500 µL of liquid reagent was lost, a deficient amount of the reagent in the reagent recipient (as may happen if a reagent recipient is compromised), or improper actuation of the pump 38 (as may happen, for example, if the pump actuation is mis-calibrated—syringe pumps may normally be actuated to dispense precise amounts of liquid based on sensors that measure how much travel a syringe plunger in such a pump experiences during actuation; if the sensor is mis-calibrated, then the plunger may undertravel and aspirate less liquid than desired—in a similar manner, a syringe pump may be mis-calibrated in the opposite direction as well, e.g., it may aspirate more liquid than desired, in which case the flow meter may measure more liquid volume than the protocol specifies should be aspirated). It is to be understood that volumetric flow tests involving syringe pumps may start and end with the pumps in a home position (as described earlier), e.g., with the syringe plungers at a bottommost position such that no further fluid may be expelled from the syringe.

It is to be understood that reference to "aspirating a predetermined amount of liquid" or the like, as the phrase is used herein, references aspiration that is intended to obtain the predetermined amount of liquid. In an ideal state, the amount of liquid that is obtained will equal the volume of aspirated liquid. However, if there is a leak or some other factor that reduces the amount of liquid that is actually obtained through such aspiration, then the actual amount of liquid that is obtained through such an aspiration will be less than the amount of liquid that is desired. It is to be understood that reference to aspirating an amount of liquid may be replaced herein with the phrase "aspirating and amount of fluid" for additional clarity. For example, if 2000 µL of fluid is aspirated from a recipient that only has 1500 µL of liquid in it, the resulting 2000 µL of aspirated fluid may include 1500 µL of liquid and 500 µL of air.

Another aspect of system performance that may be tested is to check for volumetric flow rate. For example, the pump 38 may be operated at one or more specified dispensation rates according to a test protocol. The flow meter 80 may be used to monitor the volumetric flow rate of the liquid being pumped out of the pump 38 during the dispense operation and may confirm that the pump 38 is dispensing liquid at a rate that aligns with the specified volumetric flow rate of protocol. Such volumetric flow rate measurements/determinations may be performed concurrently with total volumetric flow determinations, as discussed earlier.

As part of a diagnostic test, reagents for a plurality or all of the flow paths for the analysis instrument may be tested. This may, for example, also include testing every flow path to each reagent recipient. While a larger portion of the flow paths to the various reagents may be shared in common, e.g., the portions passing along the bypass line 62 or through the flow cell 20 lanes A and/or B, the flow paths for each reagent may diverge downstream of the RSV 66. Testing each such flow path may allow for potential leaks to be identified that may exist in the area downstream of the RSV 66, e.g., if a sipper that is fluidically connected with the RSV 66 and used to aspirate liquid out of a reagent recipient is damaged, e.g., cracked or otherwise compromised, or has become loose (sippers may, for example, be provided as tubes with threaded fittings at the end that may be screwed into a larger manifold that routes fluids from the sippers to the RSV 66) and such that fluid may flow into the sipper from locations other than the sipper tip, this may allow air to be aspirated into the flow path through such an entrance point, thereby decreasing the amount of liquid that is aspirated.

In some implementations, such volumetric flow rate and volume testing may be performed using portions of the reagents that used during actual analysis. In other implementations, the reagents may be replaced with less-expensive or otherwise less problematic liquids, e.g., distilled water (such liquids may, for example, be selected or modified to mimic various fluid properties of the reagents, such as viscosity, if desired). Flow volume and/or flow rate testing may be performed at varying intervals and with varying frequency. In some implementations, one or both types of testing may be performed, for example, when the analysis instrument is first turned on and loaded with reagents. In some additional implementations, one or both types of testing may be performed when a reagent cartridge or source is removed and replaced with a new reagent cartridge or source. In some additional or alternative implementations, one or both types of testing may be periodically performed, e.g., according to a regular schedule or in response to a predetermined number of analysis cycles being performed, etc.

Returning to FIG. 4, upon completion of the delivery sequence 108, the data acquisition and analysis system 48 may proceed to the data process/analysis sequence 110 (including processes 132 to 144), during which one or more types of data processing may be performed on the data from the volumetric flow meter, per the discussion above. For example, at 132, the data acquisition and analysis system 48 may optionally perform data cutoff on data collected during the delivery sequence 108. The data cutoff may include applying "upper" and "lower" cutoff filters to the collected flow rate data as will be discussed in FIG. 5. At 134, the data acquisition and analysis system 48 may perform another filtering on the filtered flow rate data (from 132). For example, a "moving average filter" may be applied to the flow rate data as will be discussed in FIG. 5. At 136, the data acquisition and analysis system 48 may integrate the filtered flow rate data to calculate a total flow volume for a given flow. For example, a trapezoidal integration on the filtered flow rate data may be performed to calculate the total flow volume, as will be discussed with respect to FIG. 6.

At 138, the data acquisition and analysis system 48 may optionally calculate an average flow rate and/or a standard deviation of the flow rates based on the filtered data (at 134); this may be omitted if pump rate testing is not being performed. The data acquisition and analysis system 48 may also calculate a flow volume based on the data analyzed in process 136, as mentioned above and as will be discussed further with reference to FIG. 7. At 140, the data acquisition and analysis system 48 may determine a pass/fail status for the flow path (reagent) tested. For example, the pass/fail determination may be based on a comparison between the calculated total flow volume and a predetermined flow volume, as will be discussed in FIG. 7. The predetermined flow volume may be a reagent-specific value (depending on a specified genetic sequencing protocol) or may be based on the pumping capacity (e.g., pumping volume) of the pump 38. For example, if a particular reagent is to be used in the quantity of 2000 µL during an analysis protocol, then the predetermined amount may be 2000 µL to mimic that amount used during the performance of the analysis protocol. In another example, if the syringe pumps have a maximum displacement of 1500 µL, then the predetermined amount may be 1500 µL, even if more than that amount is used during an analysis protocol (requiring multiple syringe aspiration cycles). If the calculated total flow volume is greater or smaller than the predetermined flow volume and the difference is greater than a predetermined threshold value or tolerance, a sequencing system 10 may be considered to be failing the volumetric reagent delivery test for the selected flow path (reagent), and the delivery test control logic 104 may proceed to block 142 to log the test results. If the calculated average flow volume is equal to, or within the predetermined threshold value or tolerance of the predetermined flow volume, the sequencing system 10 may be considered to be passing the volumetric reagent delivery test for the selected flow path (reagent), and the delivery test control logic 104 may proceed to 144 to log the test results. In may be appreciated that the threshold value or tolerance may be 0.01%, 0.1%, 1%, 5%, or 10% of the predetermined flow volume or may be any suitable value depending on the reagent selected, the genetic sequencing protocol, the inherent accuracy of the pump 38, the inherent measurement accuracy of the flow meter 80, among other factors.

The data and/or results logged in the processes 142 and 144 may be stored in the memory circuitry 50 and/or may be provided to authorized users through the interface 52 (upon request or by protocol). It may be appreciated that knowing the pass/fail outcome of the volumetric reagent delivery test may help verifying the accuracy of the instrument 12 and with making corrections. Further, the data and/or results logged in the process 142 and the process 144 may also help troubleshooting the problem(s) in case one or more flow paths fail the volumetric reagent delivery test.

At 146, the delivery test control logic 104 has completed the volumetric flow delivery test for the selected flow path (reagent) of interest, and the control system 46 may proceed to a next flow path (reagent) of interest, based on the test protocol at 148. For example, the control system 46 may return to 120 to set the RSV to the next position or port specified in the protocol, and may execute the processes (122 to 146) for another reagent of interest. If only flow rate testing is being performed, e.g., to determine if the pump(s) 38 are performing correctly, it may be unnecessary to test all of the reagent flow paths since the dispense action of the pump(s) may utilize the same flow paths to the flow meter 80 regardless of which reagent is selected. However, if volumetric delivery testing is being performed, then each reagent flow path may be tested. As such, the delivery test control logic 104 may continue until each of the flow paths (reagents) of interest is tested. Alternatively, the control system 46 may end the volumetric flow delivery test and exit the delivery test control logic 104 upon completion of flow path (reagent) testing or upon receiving an instruction by a user.

Figure 5:
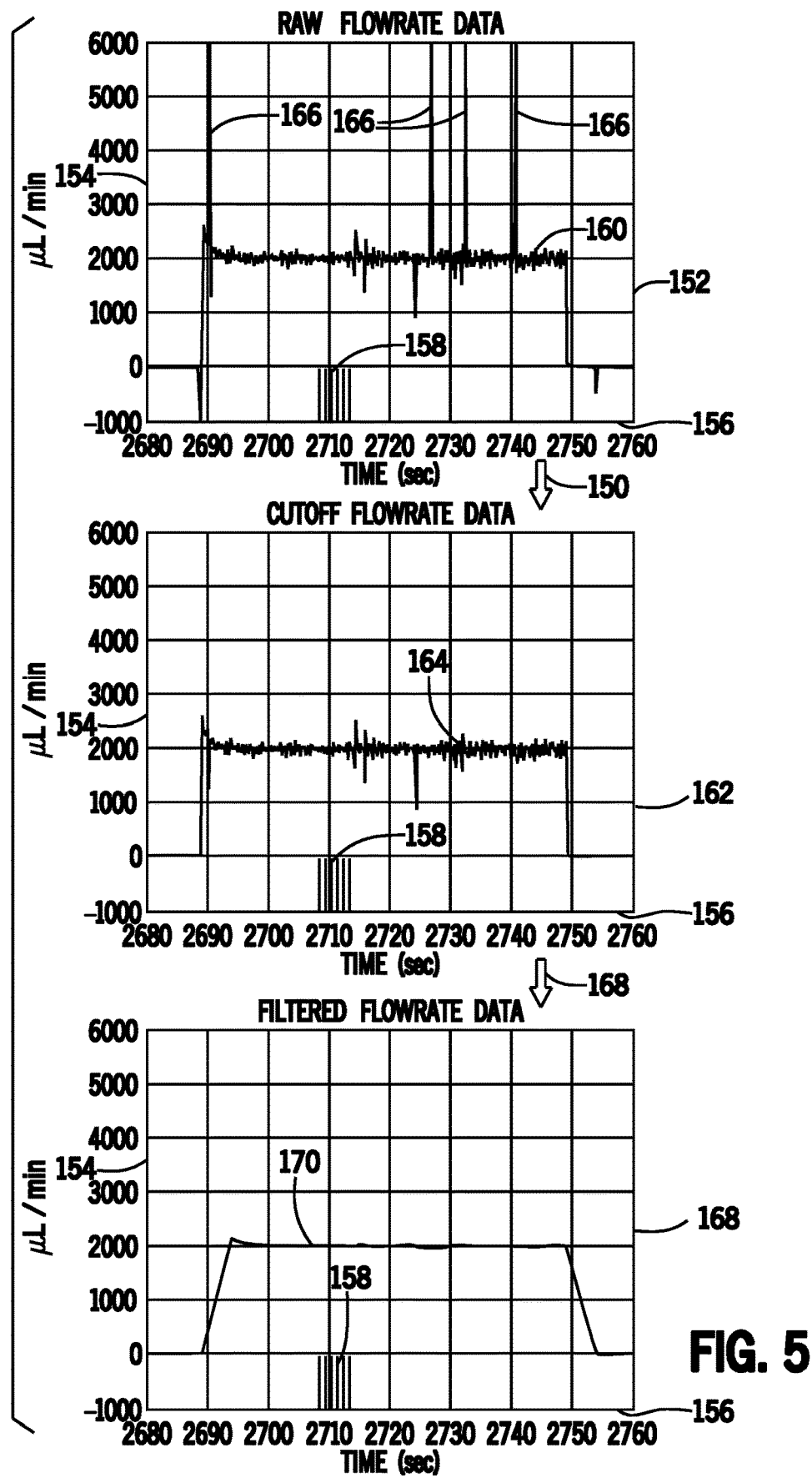
FIG. 5 is a diagram illustrating an example of a data cutoff analysis followed by a moving average filtering analysis performed on measured flow rate data.

FIG. 5 is a diagram illustrating an example of the data cutoff analysis and data filter (moving average) analysis as mentioned at 132 and 134 of FIG. 4. The diagram includes an raw flow rate data chart 152, a filtered flow rate data chart 162, and an average analysis chart 168 having the vertical axis 154 representing flow rate in microliters per minute (µL/min) and the horizontal axis 156 representing time in seconds (sec). In the raw flow rate data chart 152, the raw trace 160 is plotted in terms of time steps 158 as the raw flow rate data is collected by the flow meter 80. It may be appreciated that the time steps 158 may be any suitable time intervals (e.g., 0.5, 1, 2, 3, 4, 5, or 10 seconds) selected for the test protocol and may not be smaller than the response time (e.g., 20 milliseconds) of the flow meter 80. There may be one or more spikes 166 which may be noise having negligible impacts on measurement accuracy but significantly deviating from the norm or the trend of the raw trace 160. It may nonetheless, in some instances, be desirable to remove the one or more spikes 166 from the proceeding analyses to improve accuracy.

From the raw traces 160, values (corresponding to the one or more spikes) may be removed based on specified upper and lower cutoff limits. In one example, if a value is outside of the specified cutoff limits, that value may be replaced with the previous value (e.g., value in the previous time step) to produce a trace 164 (e.g., filtered trace) as shown in the filtered flow rate data chart 162. In certain implementations, the lower cutoff value may be about 0 µL/min and the upper cutoff value may be about 5000 µL/min. Alternatively, the lower and upper limits may be any suitable values that are reagent-specific depending on the test protocol. It should be noted that upon completion of the cutoff analysis 150 as set forth above, the trace 164 may be cleaner (e.g., with reduced data noise) as compared to the trace 150. In one aspect, the "removed values" may also be useful in providing information as to the characteristic of the fluid. For example, the number of points (e.g., the one or more spikes) removed or cut off may be proportional to the number of air bubbles in the fluidic system. As such, the number of spikes may be summed and the total number of microbubbles in the fluidic system may be estimated based on the number of spikes observed for a given sample. The estimated number of microbubbles acquired in such a manner may be compared against a predetermined threshold amount of microbubbles, if desired, and an alert or notification generated alerting a user to the presence of an undesirably high frequency of microbubble generation or presence if the estimated number of microbubbles exceeds such a threshold.

Subsequent to the cutoff analysis 150, an average (moving average) analysis 168 may be performed, in which a data filtering process is applied to the trace 164 using a specified moving average filter to produce an averaged value trace 170 (e.g., filtered trace) as shown in an average analysis chart 168. It may be appreciated that a moving average filter (or a low pass filter) is a filter commonly used for smoothing any array of sampled data/signal. In certain implementations, a window size for the moving average analysis may be 50 data points at a 0.1 second time step (e.g., 50 flow rate data points are averaged to produce an average flow rate value). Alternatively, any other suitable window size may be used. Alternatively, any other suitable average analysis may be used, such as frequency-based Fourier transforms, e.g., converting the data into the frequency domain using a Fourier transform, removing the higher-order harmonics and frequencies from the frequency domain data set, and then converting the adjusted frequency domain data set back into the time domain to produce a filtered data set that does not include the higher-frequency noise.

Figure 6:
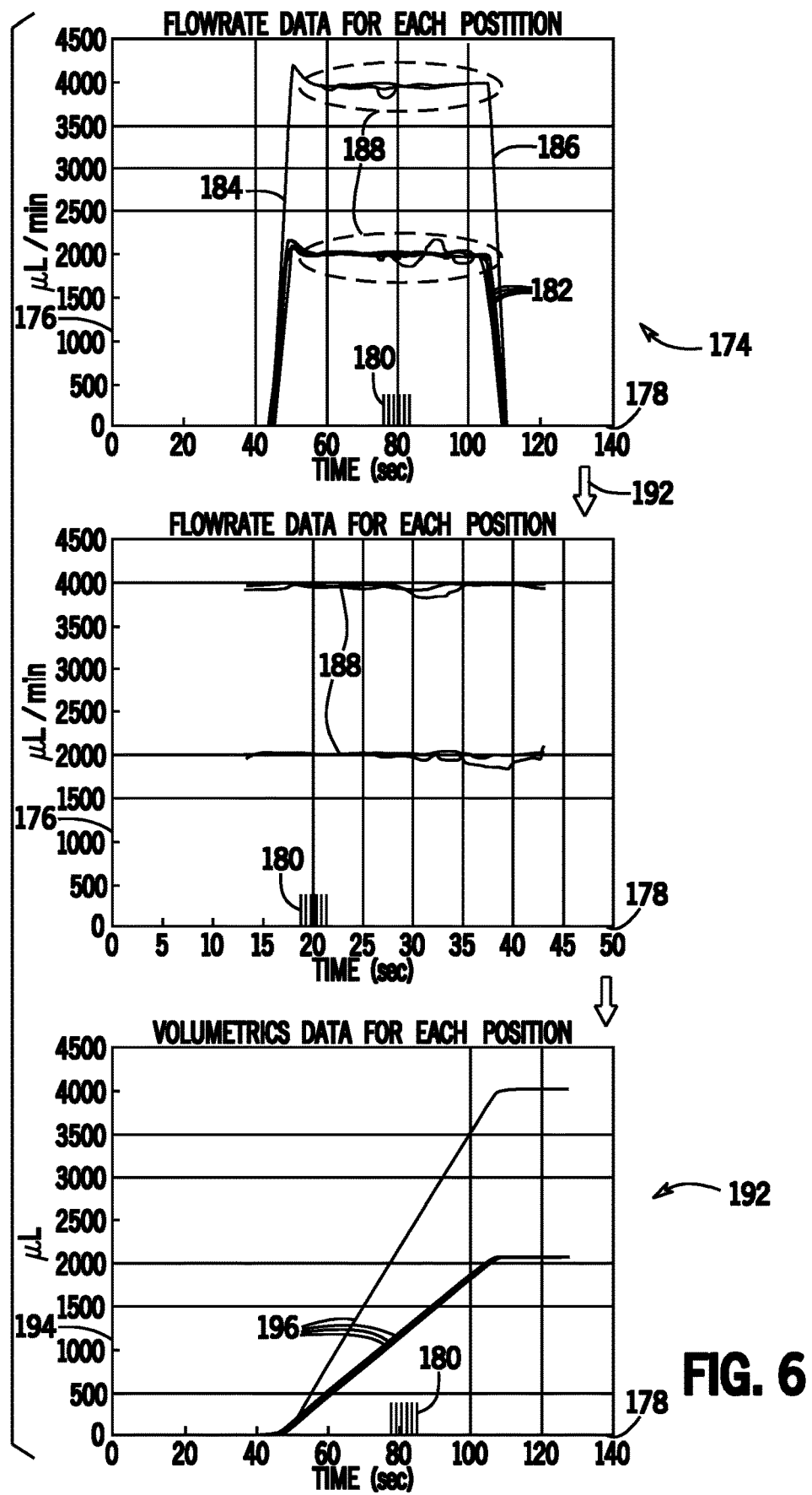
FIG. 6 is a diagram illustrating an example of an integration analysis performed on the filtered flow rate data to determine a flow volume.

FIG. 6 is a diagram illustrating an example of the integration analysis as mentioned at 136 of FIG. 4. The diagram includes a filtered flow rate data chart 174 and a truncated flow rate data chart 190 having the vertical axis 176 representing flow rate in μL/min and the horizontal axis 178 representing time in seconds. In the filtered flow rate data chart 174, a plurality of full traces 182 are plotted as a function of time steps 180, wherein each of the plurality of full trace 182 represents the filtered flow rate data (e.g., filtered by the processes 132 and 134) obtained for a respective flow path (reagent). It should be noted that each of the plurality of the full traces 182 includes a rise trace 184 where the flow rate rises rapidly with time, a fall trace 186 where the flow rate falls rapidly with time, and a steady-state trace 188 between the rise trace 184 and the fall trace 186 where the flow rate remain relatively constant. The rise trace 184 and the fall trace 186 may be due to the fluidic inertance (e.g., the pressure difference in a fluid required to cause a change in volumetric flow-rate with time) and fluidic capacitance, and the initiation of flow following commands issued to the pump 38 (e.g., on the order of several to tens of milliseconds).

In certain implementations, it may be desirable to remove flow rate data in the rise trace 184 and the fall trace 186 from the preceding data process/analysis to improve accuracy, e.g., during flow rate measurement as opposed to total volumetric flow volume measurement. For example, the data acquisition and analysis system 48 may have a pre-determined "start delay" time (e.g., approximately spanning the rise trace 184) and/or a pre-determined "length" time (e.g., approximately spanning the steady-state trace 188) specified in the protocol, such that the flow data from the rise trace 184 and the fall trace 186 may be removed, truncated, or ignored, and only the flow rate data measured after the flow meter 80 has reached a steady-state remains for further analysis, resulting in the truncated flow rate data chart 190. It should be noted that an average flow rate and a corresponding standard deviation may be calculated based on flow rate data in the steady-state trace 188.

Next, the data acquisition and analysis system 48 may perform an integration on the rise trace 184, the steady-state trace 188, and the fall trace 186 over the corresponding time period to determine total flow volume as shown in the integration data chart 192. While any suitable numerical integration methods may be used for the integration process (e.g., at 136), in the illustrated implementation, a trapezoidal integration is performed on the steady-state trace 188 to produce the integration data chart 192. The integration data chart 192 has a vertical axis 194 representing the flow volume delivered during the volumetric reagent delivery test in μL and has the horizontal axis 178 representing time in seconds. A plurality of volume traces 196 are plotted as a function of time steps 180, wherein each of the plurality of volume traces 196 represents total flow volume data obtained for a respective flow path (reagent). As shown in the plurality of volume traces 196, the flow volume for each flow path (reagent) continues to increase with time before saturating to a value, which represents an integrated flow volume that is used to determine a pass/fail result of the volumetric reagent delivery test as discussed in the process 140 of FIG. 4.

Figure 7:
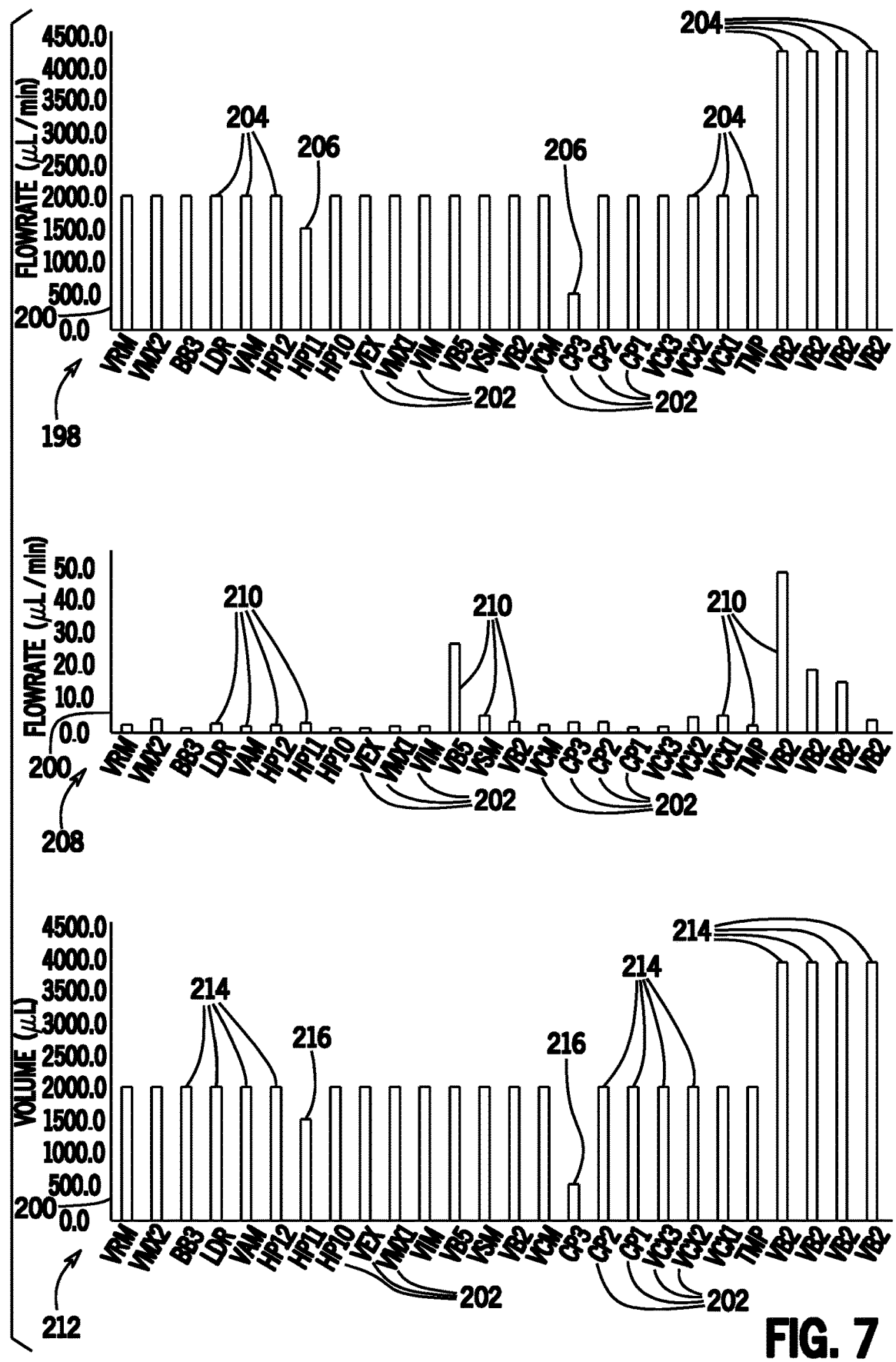
FIG. 7 is a diagram illustrating an example of results of the automated volumetric reagent delivery test including measured flow rate, standard deviation, and calculated flow volume presented for each tested flow path.

FIG. 7 is a diagram illustrating an example of results of the volumetric reagent delivery test having the measured flow rate, standard deviation, and calculated flow volume presented for each tested flow path. The diagram includes a bar graph 198, a bar graph 208, and a bar graph 212, each having a plurality of values corresponding to the plurality of flow paths (reagents) tested following the delivery test control logic 104 set forth above. In the bar graphs 198 and 208, the vertical axis 200 represents the average flow rate (e.g., calculated based on flow rates measured after a steady-state delivery has been reached) in μL/min and the horizontal axis 202 represents the tested flow paths (reagents). In the illustrated implementation of bar graph 198, the average flow rate data includes a plurality of normal/expected flow rate data 204 as well as a few abnormalities 206. For example, according to the test protocol, the average flow rate may be about 4000 μL/min for some flow paths (the four flow paths marked VB2 on the right side of the bar graph 198) and about 2000 μL/min for the other flow paths. For the flow paths that should have a flow rate of about 2000 μL/min, values of about 1500 μL/min and about 500 μL/min are outside the normal range, e.g., ±10% of 2000 μL, and thus considered the abnormalities 206. It should be noted that the test protocol may be set up based at least in part on the sensing accuracy of the flow meter 80, e.g., the flow rate may be chosen such that the flow rate is maintained at a level for which the flow meter has acceptable accuracy. For example, a recommended flow rate may be about 1000 μL/min. In another example, a recommended flow rate may be below a theoretical flow rate of about 40000 μL/min, and below, or a practical flow rate of about 10000 μL/min. In the present context, the term "about" is intended to mean that the values indicated may not be exact and the actual value may vary from the indicated value in a manner that does not materially alter the operation concerned. For example, the term "about," as used herein, is intended to convey a suitable value that is within a particular tolerance (e.g., ±10%, ±5%, or ±1%) of the indicated value, as would be understood by one skilled in the art.

A standard deviation value may be calculated corresponding to each average flow rate (e.g., 204 and 206) and shown as values 210 in the bar graph 208. In certain implementations, the pass/fail determination as discussed in the process 140 of FIG. 4 may also be based the standard deviation values set forth above.

Finally, in the bar graph 212, the vertical axis 200 represents the average flow volume in μL and the horizontal axis 202 represents the tested flow paths (reagents). In bar graph 212, the integrated flow volume data includes a plurality of normal/expected flow volume data 214 (corresponding to the normal/expected flow rate data 204—in this example, the data represents the total volumes flowed over one-minute intervals) as well as a few abnormalities 216 (resulting from the abnormalities 206). For example, according to the test protocol (which may involve volumetric flows lasting 1 minute for each reagent/flow path), the integrated flow volume may be about 4000 μL for some flow paths and about 2000 μL for the other flow paths. For the flow paths that should have flow volume about 2000 μL, a value about 1500 μL and about 500 μL may be considered to be outside the acceptable range (e.g., the difference between these values and the desired value is greater than a pre-determined threshold), and thus considered as the abnormalities 216. Based on the results (e.g., FIG. 7) of the automated volumetric delivery test (e.g., if the volumetric delivery test indicates that one or more reagent flows are outside of the acceptable limits), a diagnostic sequence or test may be performed to check the instrument 12 for leaks or blockages that may result in an incorrect reagent volume being delivered during sequencing.

It may be appreciated that the expected integrated flow volume may depend at least in part of the capacity of the pump 38. Based on the fluidic system set forth above, the integrated flow volume is expected to be equal to the volume of fluid displaced by the pump 38. For the pump 38 having two pairs of syringes 70 (e.g., each has a capacity of about 1000 µL), the volume of fluid displaced by the pump 38 is between about 2000 µL and about 4000 µL (e.g., about 2000 µL if only one pair of syringes 70 are dispensed, and about 4000 µL if two pairs of syringes 70 are dispensed). In some implementations, syringes 70 of greater or less than about 1000 µL (e.g., about 1250 µL, about 500 µL, about 250 µL) may be used, and the expected integrated flow volume would change accordingly.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

It is also to be understood that the use of "to," e.g., "a valve to switch between two flow paths," may be replaceable with language such as "configured to," e.g., "a valve configured to switch between two flow paths", or the like.

Terms such as "about," "approximately," "substantially," "nominal," or the like, when used in reference to quantities or similar quantifiable properties, are to be understood to be inclusive of values within ±10% of the values specified, unless otherwise indicated.

In addition to the claims listed in this disclosure, the following additional implementations are to be understood to be within the scope of this disclosure:

Implementation 1: A system including: a reagent selector valve controllable to select a reagent flow path from a plurality of reagent flow paths; a pump coupled to the reagent flow path to draw a liquid through the reagent flow path in accordance with a prescribed test protocol; a discharge flow path to expel the drawn liquid; a flow meter to measure liquid displaced by the pump and that generates data representative of the measured flow; and a processor to access the data and to determine a volume or mass of the liquid displaced by the pump.

Implementation 2: The system of implementation 1, in which the pump includes a syringe pump.

Implementation 3: The system of implementation 1, in which the flow meter is coupled in the discharge flow path.

Implementation 4: The system of implementation 1, in which the flow meter is to measure flow rates at a plurality of time steps during the test protocol.

Implementation 5: The system of implementation 4, in which the processor is to integrate the measured flow rates to obtain the total volume or mass of the liquid displaced by the pump.

Implementation 6: The system of implementation 1, in which the processor is to perform low-pass filtering of the measured flow rates.

Implementation 7: The system of implementation 1, including control circuitry to control operation of the reagent selector valve and of the pump, and automated to execute another displacement test successively by selecting different reagent flow paths.

Implementation 8: The system of implementation 7, in which the control circuitry is to provide user output of results of the displacement tests.

Implementation 9: The system of implementation 1, in which the volume of fluid displaced by the pump is between about 2000 microliters and about 4000 microliters.

Implementation 10: The system of implementation 1, in which the flow rate of fluid displaced by the pump is between about 1000 microliters per minute and about 10000 microliters per minute.

Implementation 11: A system including: a flow cell through which a plurality of reagents are pumped during a genetic sequencing operation; a reagent selector valve controllable to select a reagent from the plurality of reagents disposed in respective reagent receptacles, and a common line selector valve controllable to select directing a reagent from the reagent selector valve through the flow cell or through a bypass line; a pump coupled downstream of the flow cell and the bypass line through to draw a liquid through flow paths defined by positions of the reagent selector valve and the common line selector valve in accordance with a prescribed test protocol; a discharge flow path to expel the drawn liquid; a flow meter coupled to at least one of the flow paths to measure liquid displaced by the pump and that generates data representative of the measured flow; and a processor to access the data and to determine a volume or mass of the liquid displaced by the pump.

Implementation 12: The system of implementation 11, including control circuitry to control operation of the reagent selector valve and the common line selector valve to define a desired reagent flow path.

Implementation 13: The system of implementation 12, in which the control circuitry is to execute another displacement test successively by selecting different reagent flow paths.

Implementation 14: The system of implementation 11, in which the flow meter is to measure flow rates at a plurality of time steps during the test protocol.

Implementation 15: The system of implementation 14, in which the processor is to integrate the measured flow rates to obtain the total volume or mass of the liquid displaced by the pump.

Implementation 16: A method including: implementing a stored test protocol that includes: selecting a desired reagent flow path from a plurality of reagent flow paths; actuating a pump to draw a liquid through the selected the reagent flow path in accordance with the stored test protocol; discharging the drawn liquid through a discharge flow path; and measuring flow rates of the liquid and generating data representative of the flow rates; and processing the data to determine a quality of at least one of the flow paths.

Implementation 17: The method of implementation 16, including repeating the stored test protocol for different reagent flow paths, and processing resulting data to separately determine a quality of each reagent flow path.

Implementation 18: The method of implementation 16, in which the flow rates are measured at a plurality of successive time steps.

Implementation 19: The method of implementation 18, in which processing the data includes low pass filtering the data over more than one time step of the plurality of time steps.

Implementation 20: The method of implementation 18, in which processing the data includes integrating the measured flow rates over the plurality of time steps to obtain a volume of liquid displaced during the stored test protocol.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

What is claimed is:

1. A system comprising:
   a stage having one or more ports to interface with one or more flow cells;
   a reagent selector valve controllable to select a selected reagent from a plurality of reagent recipients;
   a common line selector valve fluidically connected with, and upstream of, the reagent selector valve and controllable to direct the selected reagent selectively through the one or more ports or through a bypass line that does not lead to one of the ports;
   a discharge flow path;
   a flow meter fluidically coupled to the discharge flow path to measure a flow rate of liquid flowed through the discharge flow path and to generate data representative of the measured liquid flow;
   a pump fluidically interposed between the stage and the discharge flow path and between the bypass line and the discharge flow path, the pump to draw the selected reagent through a flow path defined by positions of the reagent selector valve and the common line selector valve and to expel the selected reagent through the discharge flow path, wherein the bypass line is fluidically connected with the pump; and
   control circuitry operatively coupled to the reagent selector valve, the common line selector valve, the pump, and the flow meter, the control circuitry having one or more processors and a memory to store machine-executable instructions which, upon being executed by the one or more processors, control the one or more processors to, responsive to the data, determine whether a fault condition exists and cause a fault notification to be provided to a user upon determining that the fault condition exists.

2. The system of claim 1, wherein the memory is to store further machine-executable instructions which, upon being executed by the one or more processors, further control the one or more processors to cause the one or more processors to perform a data cutoff on the data to remove any spikes in the data and to produce cutoff data that does not include the removed spikes, wherein the fault condition is determined responsive to the cutoff data.

3. The system of claim 1, wherein the memory is to store further machine-executable instructions which, upon being executed by the one or more processors, further control the one or more processors to cause the one or more processors to filter the data by performing a moving average of the data to produce moving average data, wherein the fault condition is determined responsive to the moving average data.

4. The system of claim 1, wherein the memory is to store further machine-executable instructions which, upon being executed by the one or more processors, further control the one or more processors to cause the one or more processors to perform an integration on the data to produce integration data indicative of a volume of the measured liquid flow, wherein the fault condition is determined responsive to the integration data.

5. The system of claim 1, wherein the memory is to store further machine-executable instructions which, upon being executed by the one or more processors, further control the one or more processors to cause the one or more processors to truncate the data to remove a portion of the data associated with a rise trace to produce truncated data that does not include the rise trace, wherein the fault condition is determined responsive to the truncated data and the rise trace is data where the flow rate rises with time.

6. The system of claim 1, wherein the memory is to store further machine-executable instructions which, upon being executed by the one or more processors, further control the one or more processors to cause the one or more processors to truncate the data to remove a portion of the data associated with a fall trace to produce truncated data that does not include the fall trace, wherein the fault condition is determined responsive to the truncated data and the fall trace is data where the flow rate falls with time.

7. The system of claim 1, wherein the memory is to store further machine-executable instructions which, upon being executed by the one or more processors, further control the one or more processors to cause the one or more processors to determine whether the fault condition exists responsive to the data and based, at least in part, upon the selected reagent.

8. A method performed using an apparatus having:
   a stage having one or more ports having one or more ports to interface with one or more flow cells;
   a reagent selector valve controllable to select a selected reagent from a plurality of reagent recipients;
   a common line selector valve fluidically connected with, and upstream of, the reagent selector valve and controllable to direct the selected reagent selectively through the one or more ports or through a bypass line that does not lead to one of the ports;
   a discharge flow path;
   a flow meter fluidically coupled to the discharge flow path to measure liquid flowed through the discharge flow path and to generate data representative of the measured liquid flow;
   a pump fluidically interposed between the stage and the discharge flow path and between the bypass line and the discharge flow path, the pump to draw the selected reagent through a flow path defined by positions of the reagent selector valve and the common line selector valve and to expel the selected reagent through the discharge flow path, wherein the bypass line is fluidically connected with the pump; and
   control circuitry operatively coupled to the reagent selector valve, the common line selector valve, the pump, and the flow meter, the control circuitry having one or more processors and a memory to store machine-executable instructions which, upon being executed by the one or more processors, control the one or more processors to determine whether a fault condition exists responsive to the data representative of the measured liquid flow, the method comprising:

implementing, by the control circuitry, a stored test protocol by performing one or more reagent displacement tests using the stage to determine whether the fault condition exists, wherein each reagent displacement test includes:
- a) controlling the reagent selector valve to select a reagent flow path to a reagent recipient from a plurality of reagent flow paths;
- b) actuating the pump to draw a predetermined amount of liquid through the selected reagent flow path in accordance with the stored test protocol;
- c) causing the pump to discharge the drawn liquid from the pump and through the discharge flow path;
- d) measuring flow rates of any liquid discharged through the discharge flow path during (c) and generating the data representative of the measured liquid flow, wherein the data representative of the measured liquid flow include flow rates; and
- e) processing the data representative of the measured liquid flow to determine whether the fault condition exists for the selected reagent flow;

determining, for at least one of the one or more reagent displacement tests and by the control circuitry, that the fault condition exists for the reagent flow selected for the at least one reagent displacement test; and causing, by the control circuitry, a fault notification to be provided to a user upon determining that the fault condition exists for the at least one reagent displacement test.

9. The method of claim 8, wherein processing the data representative of the measured liquid flow comprises performing a cutoff on the data representative of the measured liquid flow to remove any spikes in the data representative of the measured liquid flow and to produce cutoff data that does not include the removed spikes, wherein the fault condition is determined responsive to the cutoff data.

10. The method of claim 8, wherein processing the data representative of the measured liquid flow comprises filtering the data representative of the measured liquid flow by performing a moving average on the data representative of the measured liquid flow to produce moving average data, wherein the fault condition is determined responsive to the moving average data.

11. The method of claim 8, wherein processing the data representative of the measured liquid flow comprises performing an integration on the data representative of the measured liquid flow to produce integration data indicative of a volume of the measured liquid flow, wherein the fault condition is determined responsive to the integration data.

12. The method of claim 8, wherein processing the data representative of the measured liquid flow comprises truncating the data to remove a portion of the data representative of the measured liquid flow associated with a rise trace to produce truncated data that does not include the rise trace, wherein the fault condition is determined responsive to the truncated data and the rise trace is data where the flow rate rises with time.

13. The method of claim 8, wherein processing the data representative of the measured liquid flow comprises truncating the data representative of the measured liquid flow to remove a portion of the data representative of the measured liquid flow associated with a fall trace to produce truncated data that does not include the fall trace, wherein the fault condition is determined responsive to the truncated data and the fall trace is data where the flow rate falls with time.

14. The method of claim 8, wherein the stored test protocol is implemented by performing a plurality of reagent displacement tests.

* * * * *

UNITED STATES PATENT AND TRADEMARK OFFICE
CERTIFICATE OF CORRECTION

| | |
|---|---|
| PATENT NO. | : 11,841,376 B2 |
| APPLICATION NO. | : 17/301063 |
| DATED | : December 12, 2023 |
| INVENTOR(S) | : Drews et al. |

It is certified that error appears in the above-identified patent and that said Letters Patent is hereby corrected as shown below:

In the Claims

In Claim 8, delete "having one or more ports having one or more ports" and insert -- having one or more ports --.

Signed and Sealed this
Nineteenth Day of March, 2024

Katherine Kelly Vidal
*Director of the United States Patent and Trademark Office*